(12) United States Patent
Ohnuki (10) Patent No.: US 6,371,419 B1
(45) Date of Patent: Apr. 16, 2002

(54) ROD HOLDER

(75) Inventor: Tomoyoshi Ohnuki, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 09/584,741

(22) Filed: Jun. 1, 2000

(30) Foreign Application Priority Data

Jun. 4, 1999 (JP) ........................................ P.11-157304

(51) Int. Cl.$^7$ ................................................ F16L 3/08
(52) U.S. Cl. ........................................ 248/74.2; 248/71
(58) Field of Search ........................ 248/71, 74.1, 74.2, 248/68.1

(56) References Cited

U.S. PATENT DOCUMENTS

| | | | | |
|---|---|---|---|---|
| 4,917,340 A | * | 4/1990 | Juemann | 248/74.2 |
| 5,129,607 A | * | 7/1992 | Satoh | 248/74.2 |
| 5,460,342 A | * | 10/1995 | Dore | 248/74.2 |
| 5,568,906 A | * | 10/1996 | Hahn | 248/74.1 |

FOREIGN PATENT DOCUMENTS

| | | | | |
|---|---|---|---|---|
| DE | 2819923 | * | 11/1978 | 248/74.2 |
| EP | 18597 | * | 11/1980 | 248/74.2 |
| GB | 2092216 | * | 8/1982 | 248/74.2 |
| JP | 2572364 | | 10/1996 | |

* cited by examiner

*Primary Examiner*—Alvin Chin-Shue
(74) *Attorney, Agent, or Firm*—McGinn & Gibb, PLLC (57) ABSTRACT

A holder for clamping one or more rods is so constructed that the holder includes a holder body having a base part and a pair of side wall portions which vertically extend from the base part in parallel to each other, tongue pieces extending from upper ends of the side wall portions inwardly into the insertion inlet, and flexibly displaceable retaining pieces for receiving the rod extending from the base part to an interior of the holding part to elastically press the inserted rod toward the tongue pieces, the retaining pieces including vertical portions extending from the base part independently of and in parallel to the side wall portions, and arcuate retaining portions bent back from the vertical portions to support a lower part of the rod.

16 Claims, 8 Drawing Sheets

ROD HOLDER

BACKGROUND OF THE INVENTION

1. Field of the Invention

The present invention relates to a rod holder for use to hold a middle portion of one or more rods each having a circular cross section, such as a fuel pipe or a pipe for air-conditioner refrigerant or the like, and to fix them to a mounting part, and more particularly to the rod holder wherein the rods having different diameters can be reliably held by means of a single holder.

2. Description of the Related Art

One of the conventional rod holders of the above type is disclosed, for example, in Japanese Patent No. 2572364.

The conventional rod holder is so constructed to include a single or a plurality of holding parts each having an insertion inlet for the rod and a base part. Each of these holding parts has the base part provided with a projecting fitting portion for fixing a holder body to mounting parts which are curved in an arcuate shape to face with each other, side wall portions vertically extending from both sides of the base part, tongue pieces respectively extending from upper ends of the side wall portions inwardly into the insertion inlet toward an axis of the inserted rod, and a pair of retaining pieces for receiving the rod extending from the side wall portions so as to be gradually downwardly inclined into the holding part and formed in an arcuate shape facing with each other.

However, the conventional rod holder has had such drawbacks that because the retaining pieces for retaining the rod is constructed to extend from the side wall portions so as to be gradually downwardly inclined into the holding part, a deflection amount of the retaining pieces is very small when the rod is press-fitted into the holding part. Moreover, because the retaining pieces are constructed to flex together with the side wall portions which have also small deflection amount, a very large pressing force is required when a large-diameter rod is pressed in, which makes it difficult to assemble the rod.

SUMMARY OF THE INVENTION

This invention has been made in view of the above circumstances, and an object of the invention is to provide a rod holder which can hold even a large-diameter rod with a small pressing force, by providing the tongue pieces and the retaining pieces for retaining the rod independently and elastically displaceably, and the rods having either a small diameter or a large diameter can be easily held by a single rod holder.

In order to achieve the above described object, according to a first aspect of the invention, there is provided a rod holder for clamping one or more rod provided with at least one holding part having an insertion inlet and a base part which is a rest seat for receiving each of the rods, characterized in that the holder includes a holder body having the base part and a pair of side wall portions which vertically extend from the base part in parallel to each other, tongue pieces respectively extending from upper ends of the side wall portions inwardly into the insertion inlet, and flexibly displaceably retaining pieces for receiving the rod extending from the base part to an interior of the holding part to elastically press the inserted rod toward the tongue pieces, the retaining pieces including vertical portions extending from the base part independently of and in parallel to the side wall portions, and arcuate retaining portions bent back from the vertical portions to support a lower part of the rod.

Therefore, in the rod holder according to the first aspect of the invention, because the tongue pieces and the retaining pieces for retaining the rod are independently and flexibly displaceably formed, even a large-diameter rod can be pressed in and held with a small pressing force, and further, the rods having either a small diameter or a large diameter can be easily held by means of a single holder.

According to a second aspect of the invention, in order to improve the engaging force when the large-diameter article is held, the base part is provided with a pair of push-up force assisting pieces which are slightly oriented upwardly facing with each other.

DETAILED DESCRIPTION OF THE PREFERRED EMBODIMENTS

Now, on the basis of preferred embodiments which are shown in the attached drawings, the invention will be described in detail.

FIGS. 1 to 4 show a rod holder H1 according a first embodiment of the invention. The holder body 1 of the rod holder H1 according to this embodiment is formed of a synthetic resin such as POM or the like, and comprises a holding part 4 having an insertion inlet 2 and a base part 3.

The holder body 1 includes a fitting portion 5 for fastening the holder body 1 to a mounting part P, leaning prevention flange portions 6 extending from an upper part of the fitting portion 5 in a diametrically expanding direction, a strip shaped base part 3 extendingly formed above the flange portions 6, a pair of side wall portions 8 extendingly provided in a vertical direction from both sides of the base part 3, a pair of tongue pieces 9 respectively extending from upper ends of a pair of the side wall portions 8 inwardly into the insertion inlet 2 toward an axis of an inserted large-diameter rod B1 or a small-diameter rod B2 (see FIGS. 5 and 6), and a pair of flexible retaining pieces 10 for receiving the rod extending from the base part 3 toward an interior of the holding part 4 to elastically press the inserted rod B1 or B2 toward the tongue pieces, all of which are integrally molded.

Figure 1:
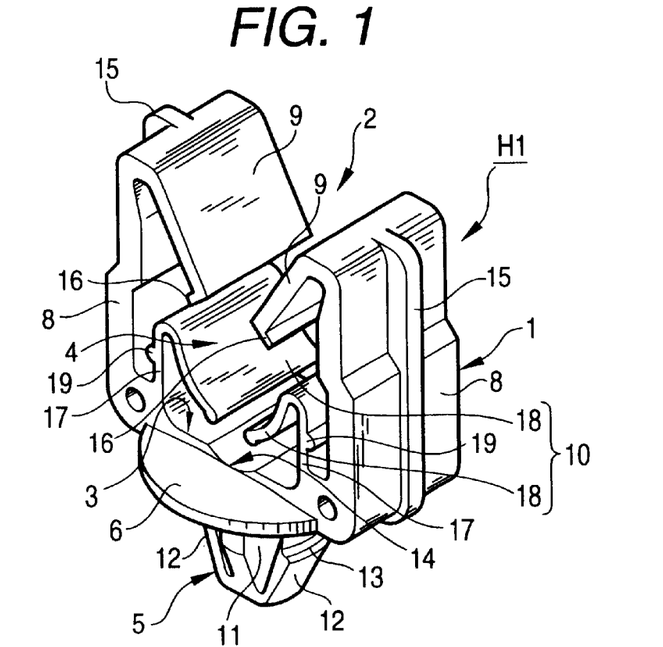
FIG. 1 is a perspective view showing a structure of a rod holder according to a first embodiment of the invention.
Figure 2:
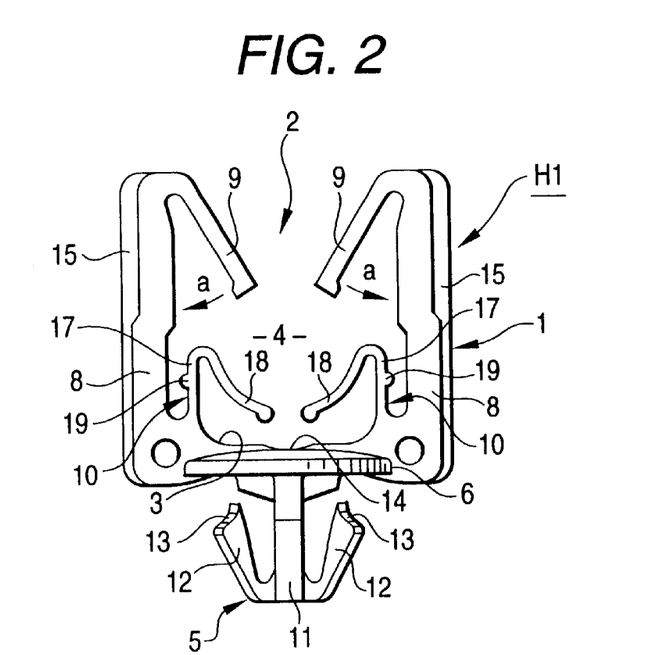
FIG. 2 is a front view of the rod holder.
Figure 3:
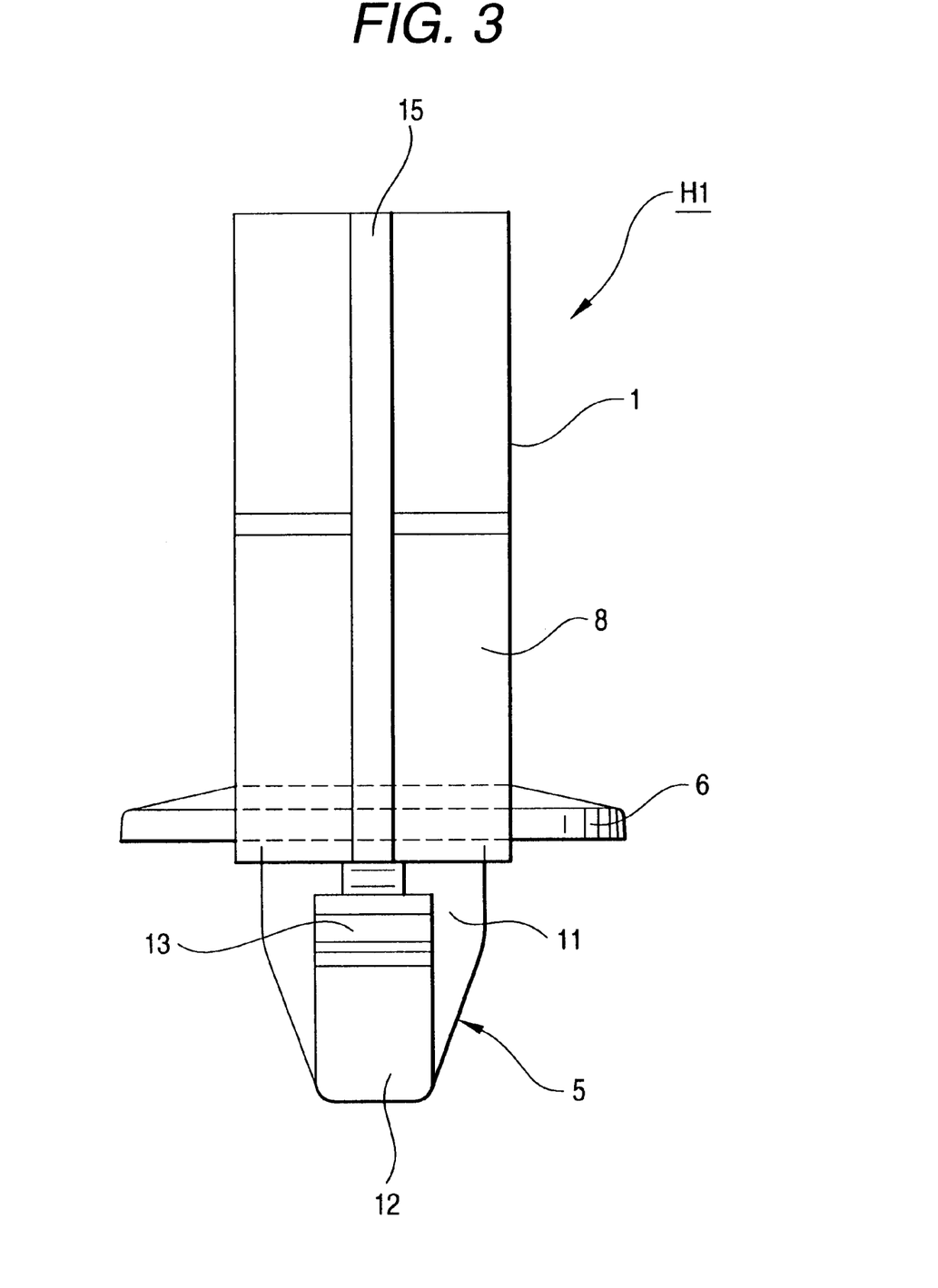
FIG. 3 is a side view of the rod holder.
Figure 4:
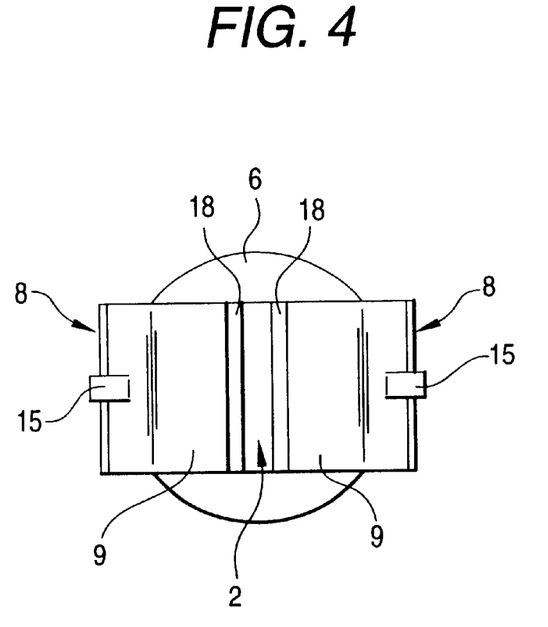
FIG. 4 is a plan view of the rod holder.
Figure 5:
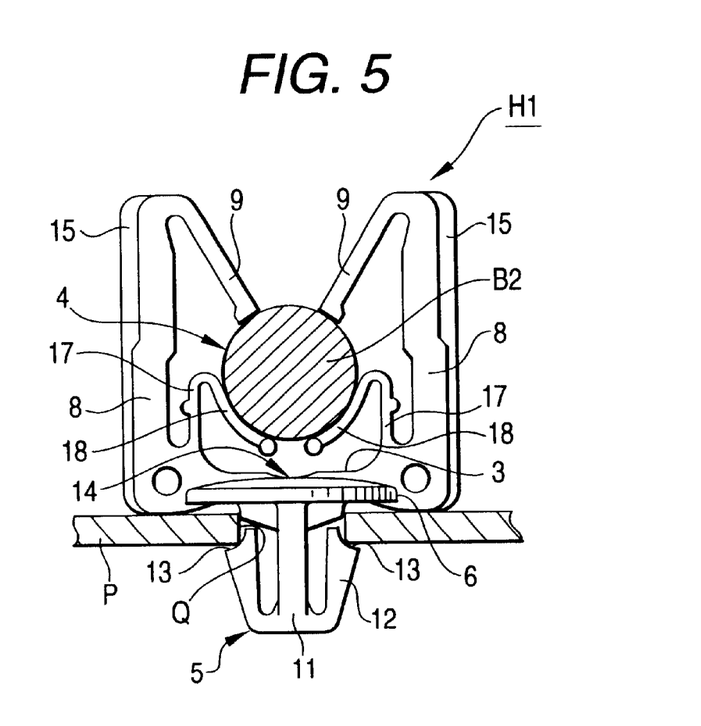
FIG. 5 is an explanatory view showing a state wherein a small-diameter rod is press-fitted and held in the rod holder.
Figure 6:
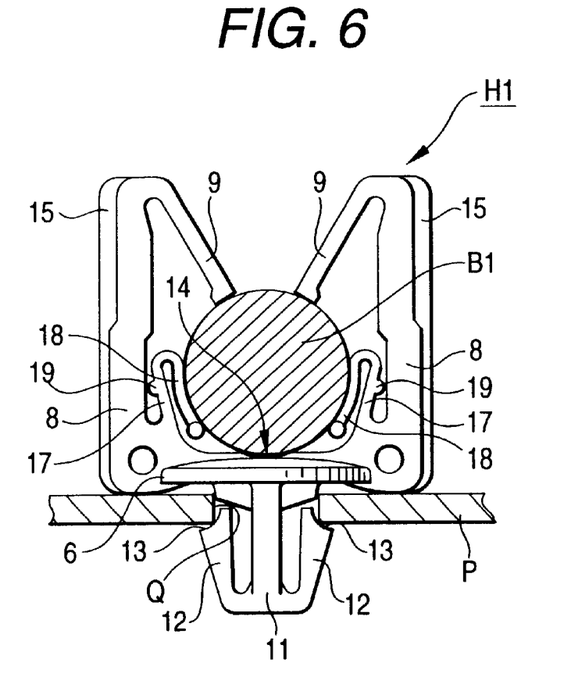
FIG. 6 is an explanatory view showing a state wherein a large-diameter rod is press-fitted and held in the rod holder.

The above described fitting portion 5 is formed in a shape of an anchor and includes a columnar portion 11 extending downwardly from a center of a lower face of the base part 3, a pair of locking pieces 12 projecting to both sides from a lower end of the columnar portion 11. Respective upper ends of the locking pieces 12 are formed with stepped portions 13, 13 which are adapted to engage with a lower edge of a fitting hole Q formed in the mounting part P as shown in FIGS. 5 and 6.

When the holder body 1 is fitted to the mounting part P, the lower ends of the locking pieces 12 of the fitting portion 5 are inserted into the fitting hole Q and pushed downward. Then the locking pieces 12 are flexed inwardly and elastically rebound to lock the stepped portions 13 with a lower edge of the fitting hole Q.

The above described flange portions 6 are formed in a round disk on its flat plane, and positioned slightly above the lower portion of the strip-shaped base part at both sides thereof. The flange portions 6 are so constructed as to prevent the holder body 1 from leaning or dropping, when an unnecessary force is exerted on the holder body 1 and it strikes the mounting part P.

Moreover, at the central part of the above described base part 3, is formed an arcuate recess 14 which is adapted to serve as a rest seat when the rod B1 having a large diameter is inserted and held.

Lower half areas of the side wall portions 8 are formed larger in thickness, while upper half areas thereof are rather smaller in thickness, and reinforcing ribs 15 are projectingly formed at the middle of the outer faces of the side wall portions 8.

A pair of the above described tongue pieces 9 are formed further smaller in thickness than the upper half areas of the side wall portions 8 and constructed to have elasticity to be flexible in a direction of a relief (in directions of arrows a in FIG. 2) so that they may not interfere with the rod B1 or B2 when they are inserted.

Lower ends 16 of the tongue pieces 9 are expanded in a substantially L-shape, and lower faces of the lower ends 16 are curved so as to be in contact with an outer peripheral face of the rod B1 or B2.

A pair of the retaining pieces 10 are formed smaller in thickness than the tongue pieces 9 and include vertical portions 17 extending in a vertical direction from the base part 3 independently of and in parallel to the side wall portions 8, and arcuate retaining portions 18 which are curved in an arcuate shape from upper ends of the vertical portions 17 to face with each other.

At a middle of the vertical portions 17 are formed pin-pushing projections 19 expanding outwardly.

Being constructed as above described, the rod holder H1 according to this embodiment will operate as follows to have the large-diameter rod B1 or the small-diameter rod B2 inserted and held.

In the case where the small-diameter rod B2 is inserted and held, the small-diameter rod B2 is pressed downward to be inserted from between the tongue pieces 9 as shown in FIG. 5. The tongue pieces 9 are pressed by the rod B2, and after they are flexibly displaced in left and right directions in FIG. 2 (in directions of the arrows a in FIG. 2), they will rebound and press the rod B2 toward an axis thereof. At the same time, the rod B2 is elastically held by the arcuate retaining portions 18 of the retaining pieces 10. In this case, the rod B2 is held in a floating manner in the holding part 4, because its diameter is not so large as to flexibly displace the retaining pieces 10.

Next, in case where the large-diameter rod B1 is inserted and held, the large-diameter rod B1 is pressed downward to be inserted from between the tongue pieces 9 as shown in FIG. 6. The tongue pieces 9 are pressed by the rod B1, and after they are flexibly displaced in the left and right directions in FIG. 2 (in the directions of the arrows a in FIG. 2), they will rebound and press the rod B1 toward an axis thereof. At the same time, the rod B1 presses the curved arcuate retaining portions 18 of the retaining pieces 10 to flexibly displace the arcuate retaining portions 18 in directions approaching to the vertical portions 17 and is received in the recess 14 of the base part 3. On this occasion, connecting points a between the vertical portions 17 and the arcuate retaining portions 18 are pressed by the arcuate retaining portions 18 which are pressed by the rod B1, and relieved towards the side wall portions 8 until the pin-pushing projections 19 are elastically abutted against inner walls of the side wall portions 8. Since the pin-pushing projections 19 press the rod B1 toward an axis thereof with a striking elasticity, a tight rod retaining force without a backlash can be obtained.

Figure 7:
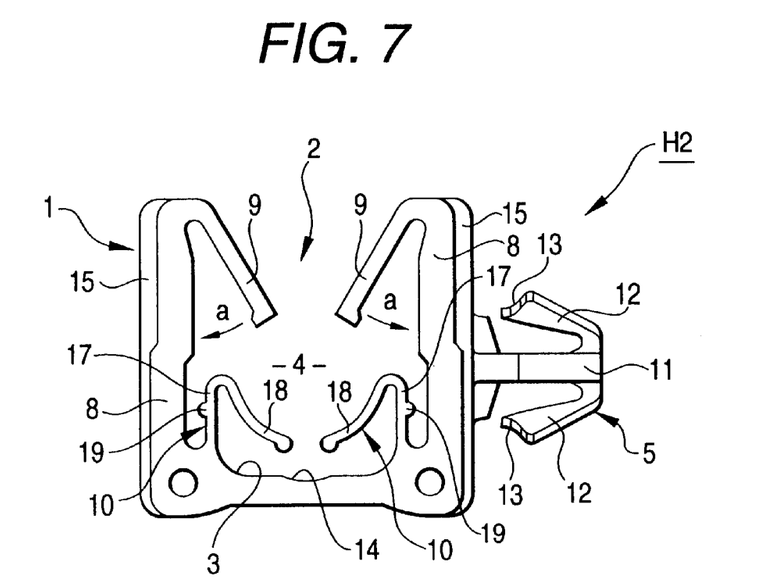
FIG. 7 is a perspective view showing a structure of a rod holder according to a second embodiment of the invention.

FIG. 7 shows a rod holder H2 according to a second embodiment of the invention. In this embodiment, different from the first embodiment, the fitting part 5 is in a shape of an anchor including a columnar portion 11 horizontally extending from one of the side wall portions 8, locking pieces 12 extending in an upward and a downward directions from a tip end of the columnar portion 11. At upper end portions of the locking pieces 12, are formed stepped portions 13 which are adapted to engage with a lower edge of the fitting hole formed in the mounting part P. Since other components and operation of this embodiment are substantially the same as in the above described first embodiment, the same reference numerals as employed in the first embodiment have been employed in the drawing and a detailed explanation of the same will be omitted here.

Figure 8:
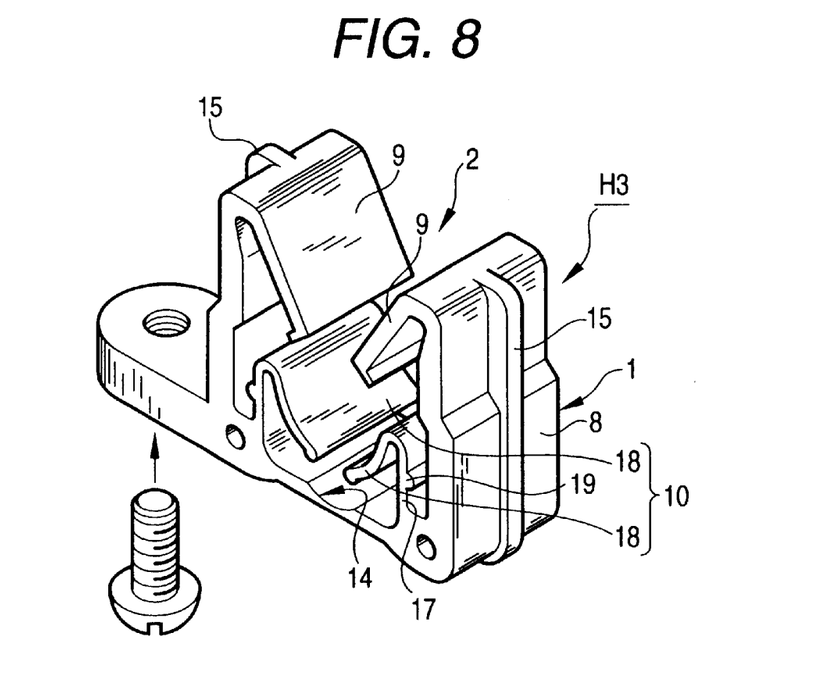
FIG. 8 is a perspective view showing a structure of a rod holder according to a third embodiment of the invention.
Figure 9:
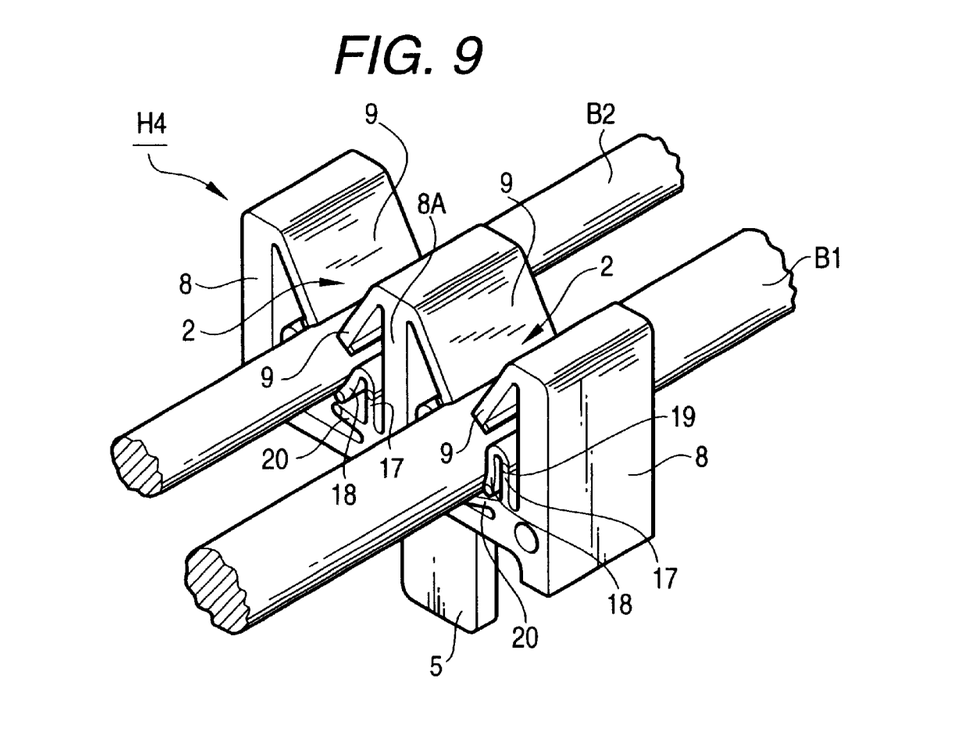
FIG. 9 is a perspective view showing a structure of a rod holder according to a fourth embodiment of the invention.
Figure 10:
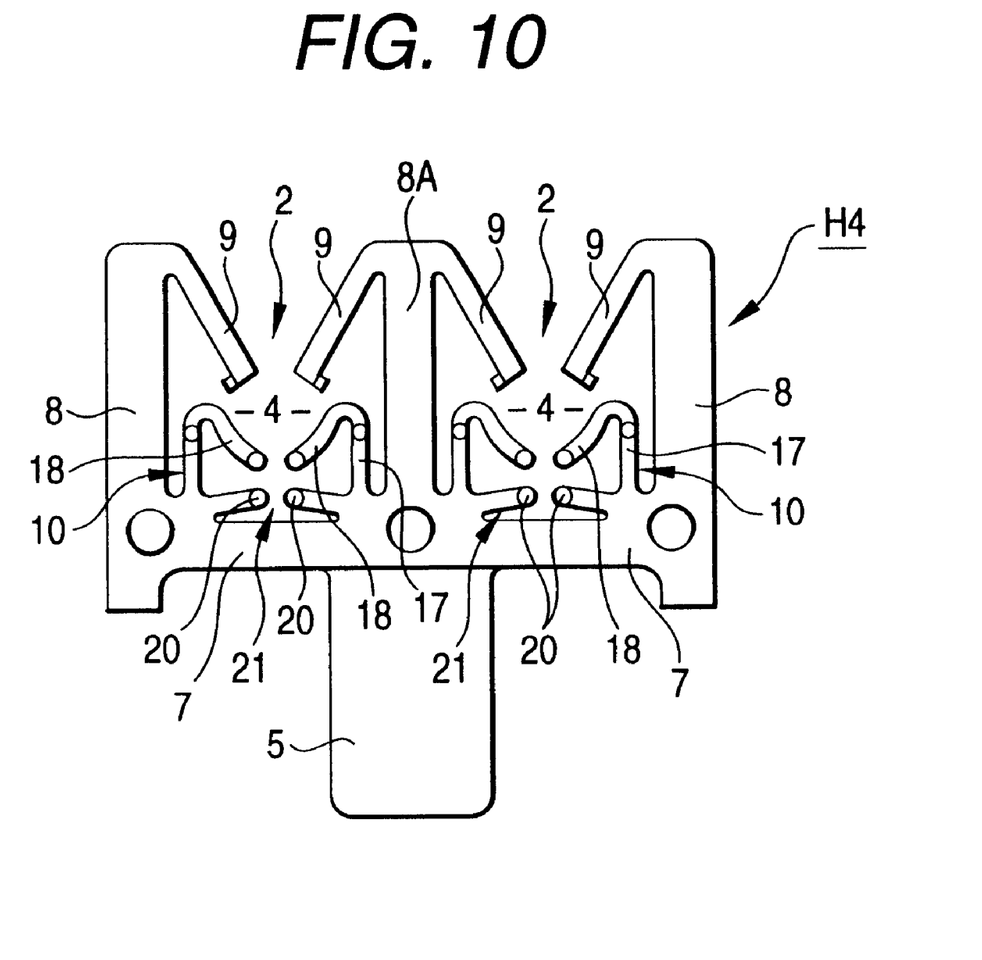
FIG. 10 is a front view of the rod holder.
Figure 11:
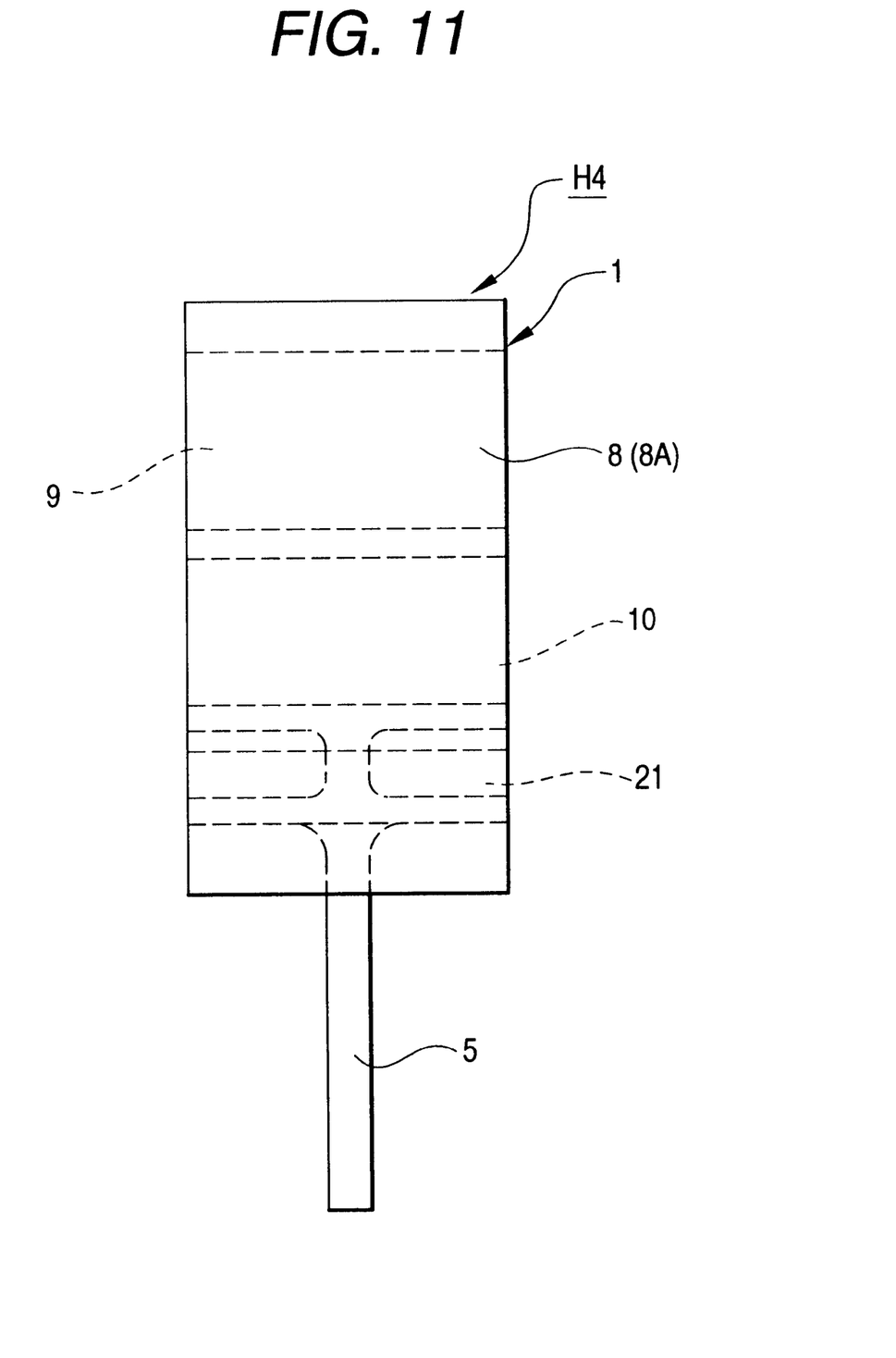
FIG. 11 is a side view of the rod holder.
Figure 12:
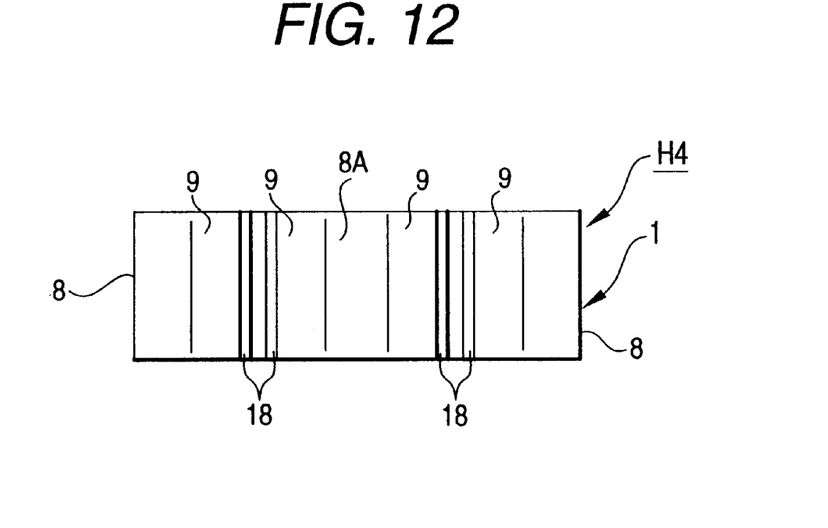
FIG. 12 is a plan view of the rod holder.

FIG. 8 shows a rod holder H3 according to a third embodiment of the invention. In this embodiment, the fitting part 5 is not in the anchor shape as in the first and the second embodiments. A fitting seat 31 is horizontally extended from a lower part of one of the side wall portions 8 and provided with a screw hole 33 into which a fastening element 32 such as a small screw is screwed, in order to meet with such a case that more rigid fitting strength is required. Since other components and operation of this embodiment are substantially the same as in the above described first embodiment, the same reference numerals as employed in the first embodiment have been employed in the drawing and a detailed explanation of the same will be omitted here.

FIGS. 9 to 12 show a rod holder H4 according to a fourth embodiment of the invention. In this embodiment, two of the holding parts 4 in the first embodiment are arranged in parallel in order to simultaneously clamp two rods B1 or B2 of a same diameter or of different diameters. Moreover, the side wall portions 8 are formed with a constant thickness omitting the reinforcing ribs 15 and an intermediate wall portion 8A is uprightly formed between the side wall portions 8. The flange portions 6 are also omitted, and a pair of push-up force assisting pieces 20 are provided instead of the recess in the base part 3. Since other components and operation of this embodiment are substantially the same as in the rod holder H1 according to the above described first embodiment, the same reference numerals as employed in the first embodiment have been employed in the drawings and a detailed explanation of the same will be omitted here.

In other words, the rod holder H4 in this embodiment is provided with strap-shaped base parts 3 at two lateral positions to form two holding parts 4 defined by the intermediate wall portion 8A. The tongue pieces 9 are extendingly formed respectively from upper ends of one of the side wall portions 8 and the intermediate wall portion 8A, from the upper ends of the intermediate wall portion 8A and the other side wall portion 8 inwardly into the respective holding parts 4. Inside the respective holding parts 4 are formed retaining pieces 10 of a similar structure to those in the first embodiment. The respective base parts 3 are provided with a pair of push-up force assisting pieces 20 which are slightly oriented upwardly facing with each other.

A pair of these push-up force assisting pieces 20 are bridgingly formed so as to cover tops of recesses 21 which are formed in the respective base parts 3 and are so constructed as to elastically contact with a lower face of the large-diameter rod and impart an upward bias force thereto, when the large-diameter rod is press-fitted so that a more tight retaining force without a backlash can be obtained.

In this embodiment, the fitting portion 5 for mounting the holder body 1 on the mounting part P is illustrated in a form of a flat plate, different from the first embodiment. However, this invention is not restricted to this shape of the fitting portion, but it is apparent that the fitting portion may be constructed similarly to the first through the third embodiments, or similarly to known locking means according to a shape of the mounting part.

Figure 13:
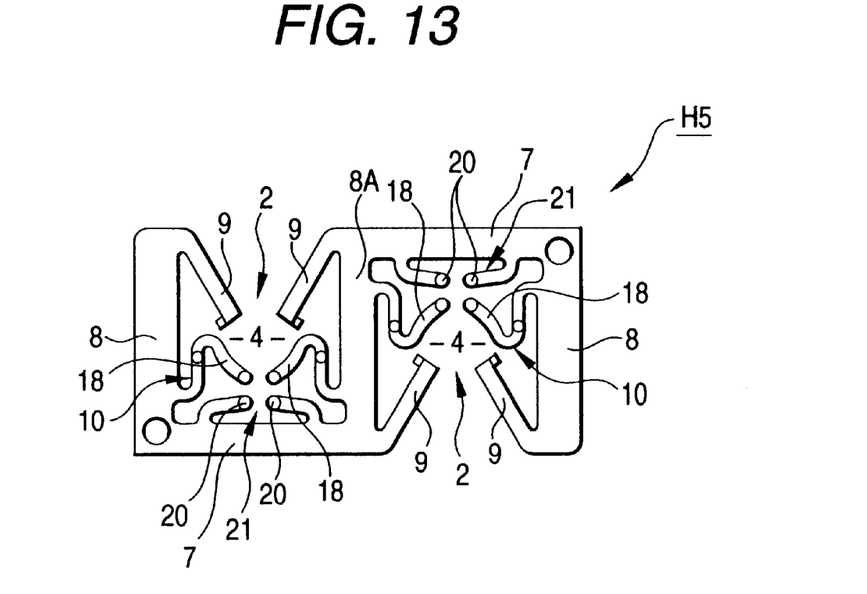
FIG. 13 is a front view showing a structure of a rod holder according to a fifth embodiment of the invention.

FIG. 13 shows a rod holder H5 according to a fifth embodiment of the invention. In this embodiment, the two holding parts 4 as employed in the fourth embodiment are vertically inverted alternately at both sides of the intermediate wall portion 8A. Moreover, the vertical portions 17 of the retaining pieces 10 are extended from lower inner parts of the side wall portions 8. The holding parts 4 are arranged in parallel so as to clamp the rods B1 or B2 of the same diameter or the rods B1 and B2 of different diameters from the above and the below. Since other components and operation of this embodiment are substantially the same as in the rod holder H4 according to the above described fourth embodiment, the same reference numerals as employed in the fourth embodiment have been employed in the drawing and a detailed explanation of the same will be omitted here.

It is apparent that the number of the holding parts for the rods is not limited to two as in the above described fourth and fifth embodiments, but three or more holding parts may be provided. The manner of arrangement may be varied according to manners of arranging and holding the rods to be held, having the insertion inlets directed in a same direction, or alternately formed as in the fifth embodiment, or further, changing directions of the insertion inlets for each group of a determined number.

As described above, there is provided, according to the first aspect of the invention, a rod holder for clamping one or more rods provided with at least one holding part having an insertion inlet and a base part which is a rest seat for receiving each of the rods, includes a holder body having the base part and a pair of side wall portions which vertically extend from the base part in parallel to each other, tongue pieces respectively extending from upper ends of the side wall portions inwardly into the insertion inlet, and flexibly displaceable retaining pieces for receiving the rod extending from the base part to an interior of the holding part to elastically press the inserted rod toward the tongue pieces, the retaining pieces including vertical portions extending from the base part independently of and in parallel to the side wall portions, and arcuate retaining portions bent back from the vertical portions to support a lower part of the rod. Therefore, because the tongue pieces and the retaining pieces for retaining the rod can be flexibly displaced independently, and as a result, even a large-diameter rod can be pressed in and held with a small pressing force, assembling of the rod of this type to the holder will be very much simplified. Moreover, the rods having either a small diameter or a large diameter can be easily held by a single holder, and so, the number of components can be reduced and a manufacturing cost can be lowered to a large extent.

According to the second aspect of the invention, the base part is provided with a pair of push-up force assisting pieces which are slightly oriented upwardly facing with each other. Therefore, the engaging force for holding the large-diameter rod can be further improved, and a more tight retaining force without a backlash can be obtained.

What is claimed is:

1. A rod holder for clamping a rod, comprising:
   a holder body having a base part which serves as a rest seat for receiving the rod and a pair of side wall portions vertically extending from said base part in parallel to each other to define a rod insertion inlet;
   a pair of tongue pieces extending from upper ends of said side wall portions inwardly downwardly into said insertion inlet, respectively; and
   a pair of flexibly displaceable retaining pieces for receiving said rod which extends from said base part to an interior of said holding body to elastically press the inserted rod toward said tongue pieces;
   wherein said retaining pieces extend from a position lower in level than a center of the rod when the rod holder holds the rod and wherein said retaining pieces include vertical portions extending from said base part independently of and in parallel to respective side wall portions, and arcuate retaining portions configured to be urged toward the tongue pieces when the rod holder holds the rod and wherein said arcuate retaining portions are bent back from said vertical portions towards a middle of the interior of said holding body and towards each other, said arcuate portions forming an upwardly semi-cylindrical concave supporting seat to support a lower part of the rod.

2. The rod holder as claimed in claim 1, further comprising a pair of push-up force assisting pieces which extend from said base part and are slightly oriented upwardly facing with each other.

3. The rod holder as claimed in claim 1, wherein said rod holder comprises a synthetic resin material.

4. The rod holder as claimed in claim 1, further comprising:
   a fitting portion for fastening said holder body to a mounting part; and
   a leaning prevention flange portion extending from an upper part of said fitting portion in a diametrically expanding direction,
   wherein said fitting portion comprises a columnar portion extending downwardly from a lower face of said base part, and a pair of locking pieces projecting upwardly from a lower end of said columnar portion.

5. The rod holder as claimed in claim 1, wherein said base part has an arcuate recess which serves as a rest seat at a center thereof.

6. The rod holder as claimed in claim 1,
   wherein lower half portions of said side wall portions are thicker than upper half portions thereof, and reinforcing ribs are projectingly formed at the middle of outer faces of said side wall portions.

7. The rod holder as claimed in claim 6, wherein said tongue pieces are thinner than the upper half portions of said side wall portions.

8. The rod holder as claimed in claim 1, wherein lower ends of said tongue pieces are expanded in a substantially L-shape and lower faces of the lower ends are curved.

9. The rod holder as claimed in claim 1, wherein said retaining pieces are thinner than said tongue pieces.

10. The rod holder as claimed in claim 1, wherein a pin-pushing projection is formed outwardly at a middle of each of said vertical portions.

11. The rod holder as claimed in claim 1, further comprising:
- a fitting portion for fastening said holder body to a mounting part; and
- a leaning prevention flange portions extending from an upper part of said fitting portion in a diametrically expanding direction;
- wherein said fitting portion comprises a columnar portion extending horizontally from one of said side wall portions; and a pair of locking pieces projecting upwardly and downwardly from a tip end of said columnar portion, respectively.

12. The rod holder as claimed in claim 1, further comprising a fitting seat horizontally extending from a lower part of one of said side wall portions.

13. The rod holder as claimed in claim 1, wherein the retaining pieces are made flexible with respect to the tongue pieces when the rod holder holds the rod.

14. The rod holder as claimed in claim 4, wherein the leaning prevention flange comprises a round disk having a flat surface.

15. The rod holder as claimed in claim 10, wherein the pin-pushing projection is configured to contact an inner wall of the side wall portions when a predetermined force is applied to the arcuate retaining portions.

16. The rod holder as claimed in claim 1, wherein the flexibly displacing retaining pieces are configured to flexibly displace in a first direction toward the base part and a second direction toward one of the side wall portions.

* * * * *